(12) United States Patent
Sudou et al.

(10) Patent No.: US 11,528,681 B2
(45) Date of Patent: Dec. 13, 2022

(54) MANAGEMENT SERVER, COMMUNICATION DEVICE, AND COMMUNICATION METHOD

(71) Applicant: KYOCERA Corporation, Kyoto (JP)

(72) Inventors: Tomohiro Sudou, Yokohama (JP); Atsushi Inoue, Yokohama (JP); Junichi Hasegawa, Machida (JP); Kaori Yamada, Yokohama (JP); Kouji Watanabe, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/650,037

(22) Filed: Feb. 4, 2022

(65) Prior Publication Data

US 2022/0159611 A1 May 19, 2022

Related U.S. Application Data

(63) Continuation of application No. PCT/JP2020/030277, filed on Aug. 6, 2020.

(30) Foreign Application Priority Data

Aug. 26, 2019 (JP) .............................. JP2019-153813

(51) Int. Cl.
*H04W 64/00* (2009.01)
*G08B 3/10* (2006.01)
(Continued)

(52) U.S. Cl.
CPC ............ *H04W 64/003* (2013.01); *G08B 3/10* (2013.01); *G08B 5/22* (2013.01); *G08B 7/06* (2013.01); *H04W 28/0226* (2013.01)

(58) Field of Classification Search
CPC ........... H04W 64/003; H04W 28/0226; H04W 4/029; H04W 4/38; G08B 7/06; G08B 5/22; G08B 3/10
See application file for complete search history.

(56) References Cited

FOREIGN PATENT DOCUMENTS

| JP | 2016-125936 A | | 7/2016 | |
|---|---|---|---|---|
| WO | 2019/142404 A1 | | 7/2019 | |
| WO | WO 2019/142404 | * | 7/2019 | ............. G08C 17/00 |

OTHER PUBLICATIONS

Written Opinion of the International Searching Authority issued in PCT/JP2020/030277; dated Nov. 10, 2020.

* cited by examiner

*Primary Examiner* — Tuan H Nguyen
(74) *Attorney, Agent, or Firm* — Studebaker & Brackett PC

(57) ABSTRACT

A management method according to an embodiment is a management method performed by a management server for managing a plurality of communication devices, and includes receiving information indicating at least one of a position or acceleration detected by each of the plurality of communication devices, and managing a position information list including installation position information for each communication device based on the information received. The managing includes, in a case that a collection mode for collecting at least one of the plurality of communication devices is configured, in response to determining that a target communication device for the collection mode has moved, updating the position information list to delete the installation position information corresponding to the target communication device, and in response to determining that the target communication device has been stationary after moving, keeping the position information list without updating the position information list.

4 Claims, 7 Drawing Sheets

(51) Int. Cl.
*G08B 5/22* (2006.01)
*G08B 7/06* (2006.01)
*H04W 28/02* (2009.01)

POSITION INFORMATION LIST

| COMMUNICATION DEVICE ID | INSTALLATION POSITION INFORMATION |
|---|---|
| ID#1 | (LATITUDE, LONGITUDE) |
| ID#2 | (LATITUDE, LONGITUDE) |
| ID#3 | (LATITUDE, LONGITUDE) |

FIG. 4

MANAGEMENT SERVER, COMMUNICATION DEVICE, AND COMMUNICATION METHOD

CROSS-REFERENCE TO RELATED APPLICATION

The present application is a continuation based on PCT Application No. PCT/JP2020/030277, filed on Aug. 6, 2020, which claims the benefit of Japanese Patent Application No. 2019-153813 filed on Aug. 26, 2019. The content of which is incorporated by reference herein in their entirety.

TECHNICAL FIELD

The present disclosure relates to a management server, a communication device, and a communication method.

BACKGROUND ART

In recent years, as Internet of Things (IoT) technology is widely used, there is an explosive increase of devices with communication functions expected. Such devices include sensor devices that detect environmental data such as temperature and humidity, and transmit the data detected to a server. For example, in farms and the like, a large number of communication devices need to be installed in order to cover a large area.

Under such circumstances, in a case where the installed communication devices need to be collected due to, for example, replacement of sensor devices, refurbishment of agricultural fields, or the like, the collection is performed either in the manner in which the installation positions of the communication devices are marked or a note for the positions is made to prevent the positions from being lost after the collection, or in the manner in which the position information is acquired through a Global Navigation Satellite System (GNSS) or the like for the communication devices and referred for the collection.

On the other hand, Patent Literature 1 describes a technology in which, in a system including a communication device provided with a GNSS and a server apparatus that manages position information of the communication device, the communication device measures acceleration to determine a mobility state of the communication device, notifies the server of GNSS position information in response to a moving state of the communication device, and disables the GNSS function in response to a stationary state of the communication device.

CITATION LIST

Patent Literature

Patent Literature 1: JP 2016-125936 A

SUMMARY

A management server according to a first aspect is a management server for managing a plurality of communication devices, the management server including a communication interface configured to receive information indicating at least one of a position or acceleration detected by each of the plurality of communication devices, and a processor configured to manage a position information list including installation position information for each of the plurality of communication devices based on the information received by the communication interface. The processor is configured to, in a case that a collection mode for collecting at least one of the plurality of communication devices is configured, in response to determining that a target communication device for the collection mode has moved, update the position information list to delete the installation position information corresponding to the target communication device, and in response to determining that the target communication device has been stationary after moving, keep the position information list without updating the position information list.

A communication device according to a second aspect is a communication device for communicating with a management server, the communication device including a communication interface, a sensor configured to detect information of at least one of a position or acceleration, and a processor configured to determine a mobility state of the communication device based on the information detected by the sensor. The processor is configured to, in response to determining that the communication device has been stationary after moving, transmit, to the management server via the communication interface, an installation notification message including position information indicating a position of the communication device in a stationary state, and in a case that a collection mode for collecting the communication device is configured, in response to determining that the communication device has moved, transmit, to the management server via the communication interface, a movement notification message for requesting deletion of the position information notified through the installation notification message.

A management method according to a third aspect is a management method performed by a management server for managing a plurality of communication devices, the management method including receiving information indicating at least one of a position and acceleration detected by each of the plurality of communication devices, and managing a position information list including installation position information for each of the plurality of communication devices based on the information received. The managing includes, in a case that a collection mode for collecting at least one of the plurality of communication devices is configured, in response to determining that a target communication device for the collection mode has moved, updating the position information list to delete the installation position information corresponding to the target communication device, and in response to determining that the target communication device has been stationary after moving, keeping the position information list without updating the position information list.

A communication method according to a fourth aspect is a communication method performed by a communication device for communicating with a management server, the communication method including detecting information of at least one of a position or acceleration, determining a mobility state of the communication device based on the information detected, in response to determining that the communication device has been stationary after moving, transmitting, to the management server, an installation notification message including position information indicating a position of the communication device in a stationary state, and in a case that a collection mode for collecting the communication device is configured, in response to determining that the communication device has moved, transmitting, to the management server, a movement notification message for requesting deletion of the position information notified through the installation notification message.

A program according to a fifth aspect causes the management server to perform the management method according to the third aspect.

A program according to a sixth aspect causes the communication device to perform the communication method according to the fourth aspect.

BRIEF DESCRIPTION OF DRAWINGS

FIG. 4 is a diagram illustrating a configuration of a position information list according to an embodiment.

DESCRIPTION OF EMBODIMENTS

Not only the need for much time and effort but also entry omissions may be involved in a recording operation for marking the installation positions of communication devices or making a note for the installation positions in order to allow the communication devices to be collected.

On the other hand, according to a method in which a server learns the position of a communication device through communication between the communication device and the server as described in Patent Literature 1, the time and effort for the recording operation as described above can be reduced, and entry omissions can be avoided.

However, with such a method, the server side has difficulty determining which communication devices have not been collected and which communication devices have been collected. Thus, the management, by the server, of the positions of collected communication devices may involve an increase in processing load or omissions of collection of communication devices.

Thus, an object of the present disclosure is to enable efficient collection of installed communication devices.

Embodiments will be described with reference to the drawings. In the description of the drawings, the same or similar parts are denoted by the same or similar reference signs.

Configuration of Device Management System

Figure 1:
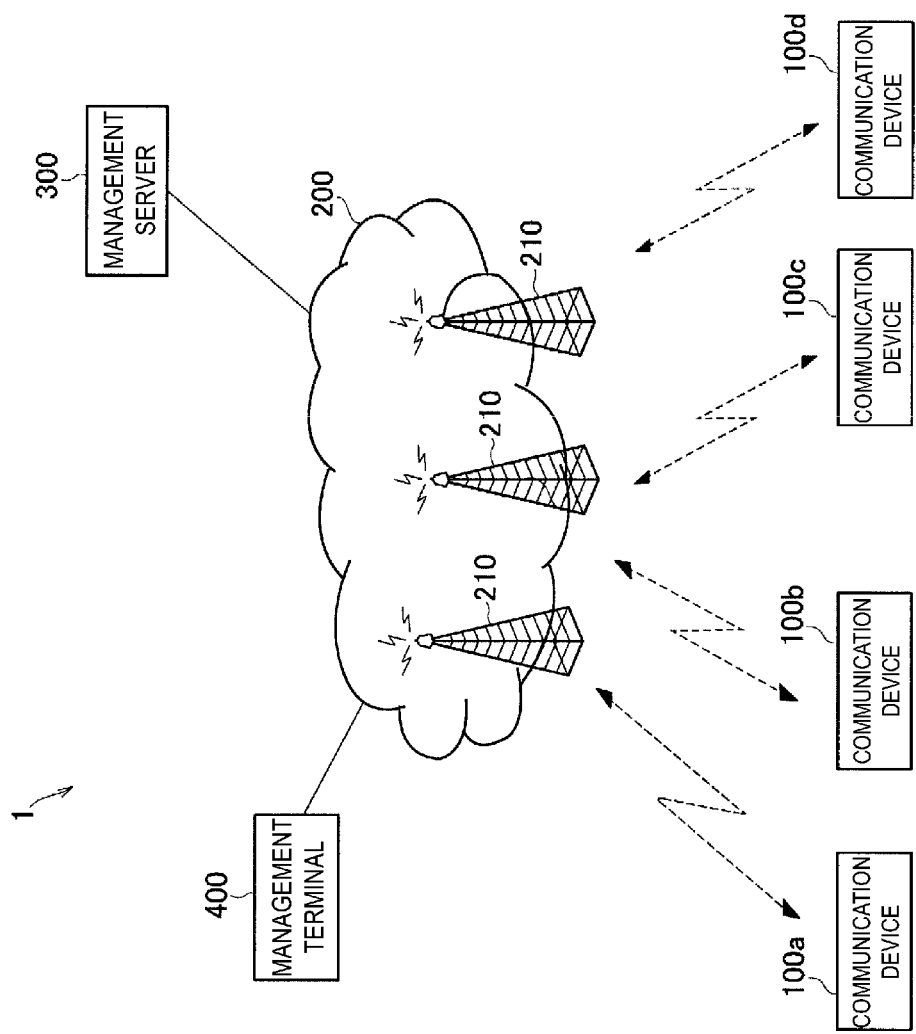
FIG. 1 is a diagram illustrating a configuration of a device management system according to an embodiment.

First, a configuration of a device management system according to an embodiment will be described. FIG. 1 is a diagram illustrating a configuration of a device management system 1 according to an embodiment.

As illustrated in FIG. 1, the device management system 1 includes a plurality of communication devices 100 (communication devices 100a to 100d), a communication network 200, a management server 300, and a management terminal 400.

The communication devices 100 are devices each having a communication function. The communication devices 100 are, for example, sensor devices including various sensors, and communicate via the communication network 200 to transmit, to the management server 300, information acquired by the various sensors.

For example, each communication device 100 performs Low Power Wide Area (LPWA) scheme-based wireless communication with the communication network 200. LPWA scheme is a wireless communication scheme that realizes long-range communication while suppressing power consumption. The LPWA scheme is, for example, cellular LPWA, SIGFOX, or LoRaWAN. The cellular LPWA may be enhanced Machine Type Communications (eMTC) or Narrow Band-Internet of Things (NB-IoT) specified in 3rd Generation Partnership Project (3GPP) standards.

In an embodiment, each communication device 100 is provided outdoors and driven by a battery provided in the communication device 100. For example, each communication device 100 detects environmental data such as the temperature and humidity of a farm, and transmits the environmental data detected to the management server 300. By collecting and managing the environmental data from each communication device 100, the management server 300 can make use of managed data for growing crops. Note that in farms and the like, a large number of communication devices are placed on the ground, underground, and near crops in order to measure local (partial) temperatures and humidities, allowing the environment of the field for crop growth to be understood.

The communication network 200 includes a plurality of base stations 210 that perform wireless communication with the communication devices 100, and a high-frequency communication network (Wide Area Network (WAN)). The communication network 200 may further include the Internet.

The management server 300 is a server connected to the communication network 200. The management server 300 manages the communication devices 100 by communicating with the communication devices 100 via the communication network 200. The management server 300 need not necessarily be a dedicated server. The management server 300 may be a general-purpose terminal (e.g., smartphone or PC) in which a device management application program is installed.

In an embodiment, with a plurality of communication devices 100 previously installed, a scenario is mainly assumed in which at least one of the plurality of communication devices 100 is collected. For example, in a case where the old communication device 100 is replaced with a new one, a case where a battery for the communication device 100 is replaced, and a case where refurbishment of agricultural fields or the like is performed, the installed communication device 100 needs to be collected.

The management terminal 400 is a terminal including a display 401 (see FIG. 5) that displays information received from the management server 300 via the communication network 200. The management terminal 400 may be a portable terminal, for example, a smart phone, a tablet terminal, a notebook PC, or a wearable terminal. The management terminal 400 may be carried by collection personnel who collects the installed communication devices 100.

Configuration of Communication Device

Figure 2:
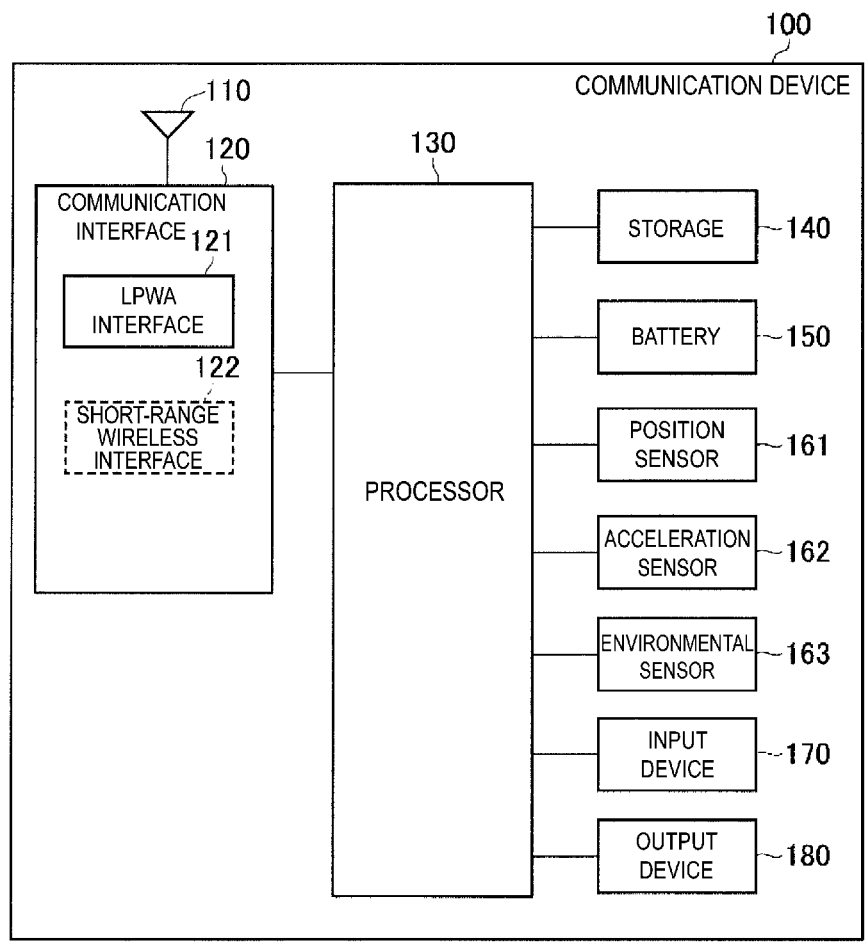
FIG. 2 is a diagram illustrating a configuration of a communication device according to an embodiment.

Now, a configuration of the communication device 100 according to an embodiment will be described. FIG. 2 is a diagram illustrating a configuration of the communication device 100 according to an embodiment.

As illustrated in FIG. 2, the communication device 100 includes an antenna 110, a communication interface 120, a processor 130, a storage 140, a battery 150, a position sensor 161, an acceleration sensor 162, an environmental sensor 163, an input device 170, and an output device 180.

The antenna 110 is used to transmit and receive radio signals. The communication interface 120 communicate with the management server 300 via the communication network 200. In an embodiment, the communication interface 120 includes an LPWA interface 121 for performing LPWA communication with the base station 210 included in the communication network 200. The communication interface 120 includes a short-range wireless interface 122 for wireless LAN communication with access points or short-range wireless communication such as Bluetooth (registered trademark) communication.

The communication interface 120 performs amplification processing, filter processing, and the like on a radio signal received by the antenna 110, converts the radio signal into a baseband signal, and outputs the baseband signal to the processor 130. The communication interface 120 converts the baseband signal output from the processor 130 into a radio signal, performs amplification processing and the like on the radio signal, and transmits the resultant signal from the antenna 110.

The processor 130 performs various processing and control for the communication device 100. The processor 130 may include a baseband processor and a Central Processing Unit (CPU). The baseband processor performs modulation and demodulation, and coding and decoding of a baseband signal, and the like. The CPU executes programs stored in the storage 140 to perform various processing.

The storage 140 includes a volatile memory and a non-volatile memory. The storage 140 stores programs to be executed by the processor 130 and information to be used for processing by the processor 130.

The battery 150 includes a primary battery or secondary battery and supplies power to drive the communication device 100.

The position sensor 161 is a sensor for detecting the current position of the communication device 100. For example, the position sensor 161 includes a GNSS receiver. The GNSS receiver may include a Global Positioning System (GPS) receiver, a Global Navigation Satellite System (GLONASS) receiver, an Indian Regional Navigational Satellite System (IRNSS) receiver, a COMPASS receiver, a Galileo receiver, a Quasi-Zenith Satellites System (QZSS) receiver, and/or the like. The position sensor 161 acquires position information (GNSS position information), and outputs the position information acquired to the processor 130.

The acceleration sensors 162 include an acceleration sensor that detects acceleration applied to the communication device 100. The acceleration sensor 162 may be a single-axis acceleration sensor or a multi-axis acceleration sensor. The position sensor 161 detects acceleration and outputs the value of the acceleration detected to the processor 130.

The environmental sensor 163 includes at least one of a temperature sensor, a humidity sensor, an atmospheric pressure sensor, a magnetic field sensor (geomagnetic sensor), an illuminance sensor, a gas sensor, a proximity sensor, or the like. The environmental sensor 163 may include an image sensor for acquiring images via image capturing. The environmental sensor 163 outputs information detected to the processor 130.

The input device 170 receives user operation and outputs a signal indicating the content of the operation to the processor 130. For example, the input device 170 includes a power switch for powering on or off the communication device 100. The input device 170 may include various keys (various buttons) that accept user input.

The output device 180 performs various output operations under the control of the processor 130. The output device 180 may include an LED indicator that outputs light representing the current state of the communication device 100 and a speaker that outputs sound (e.g., a beep sound).

In the communication device 100 configured in this manner, the processor 130 determines the mobility state of the communication device based on information detected by at least one of the position sensor 161 or the acceleration sensor 162. The mobility state refers to the state in which the communication device is moving or stationary. For example, in a case where the position sensor 161 periodically detects the current position, the processor 130 determines the mobility state of the communication device in response to a change in the detected position. In a case where the acceleration sensor 162 periodically detects acceleration, the processor 130 determines the mobility state of the communication device depending on whether the detected acceleration is greater than zero.

Note that in a case where the communication device 100 is installed near crops, when a transition from the stationary state to the moving state is determined, the determination that the stationary state has transitioned to the moving state may be made when the amount of movement exceeds a certain value in order to eliminate the effect of minute movement caused by a weather factor such as rain or wind. When a transition from the moving state to the stationary state is determined, the determination that the moving state has transitioned to the stationary state may be made in response to continuation of the stationary state for a certain period of time in order to eliminate an erroneous determination of the installation position when an installer is temporarily stationary before the installation of the communication device 100.

The processor 130 also determines whether the collection mode intended for the communication device is configured based on information received from the management server 300 by the communication interface 120. For example, the processor 130 determines that the collection mode has been configured when the communication interface 120 receives, from the management server 300, a notification indicative of the initiation of the collection mode.

In a case that the collection mode is not configured, in response to determining that communication device is stationary after moving, the processor 130 transmits, to the management server 300 via the communication interface 120, an installation notification message including position information (e.g., GNSS position information) indicating the position at which the communication device is stationary. The installation notification message is a message notifying the installation position of the communication device 100 or requesting registration of the installation position, and is a message including the ID of the communication device 100 and position information. By transmitting the installation notification message to the management server 300, the management server 300 can smoothly register the installation position of the communication device 100.

With the collection mode configured, in response to determining that the communication device has moved, the processor 130 transmits, to the management server 300 via the communication interface 120, a movement notification message for requesting deletion of the position information notified to the management server 300 through the installation notification message. The movement notification message is a message notifying that the communication device 100 has been moved or requesting deletion of the registration of the installation position, the message including the ID of the communication device 100. The movement notification message may further include position information (e.g., GNSS position information) obtained when the determination that the communication device has moved is made. By transmitting the movement notification message to the management server 300, the management server 300 can smoothly determine which communication device has been collected based on the movement notification message.

When the collection mode is configured, the processor 130 causes the output device 180 to start outputting at least one of sound or light. For example, when the communication interface 120 receives, from the management server 300, a notification indicating the initiation of the collection mode, the processor 130 may cause the LED indicator included in the output device 180 to start lighting or blinking or may cause the speaker included in the output device 180 to start outputting the beep. With the output device 180 caused to start outputting at least one of the sound or the light, the collection personnel collecting the communication device 100 can more easily locate the communication device 100 to be collected.

With the collection mode configured, in response to determining that the communication device has moved, the processor 130 causes the output device 180 to terminate the output of at least one of the sound or the light. For example, in response to determining that the communication device has moved after the communication interface 120 receives, from the management server 300, the notification indicating the initiation of the collection mode, the processor 130 causes the LED indicator included in the output device 180 to terminate lighting or blinking or to cause the speaker included in the output device 180 to terminate the output of the beep. This prevents, under a situation where the collection personnel for the communication device 100 is considered to have located and collected the communication device 100 to be collected, the sound and the light emitted by the collected communication device 100 to interfere with the collection operation of the collection personnel.

Note that a high-precision positioning may be applied by combining the position sensor 161 and the signal received by the communication interface 120. For example, the processor 130 may transmit, to the position server, position information indicating the position detected by the position sensor 161 and information related to the signal received by the communication interface 120 (e.g., the IDs of access points and received signal strength), and may acquire position information corrected by the position server.

Configuration of Management Server

Figure 3:
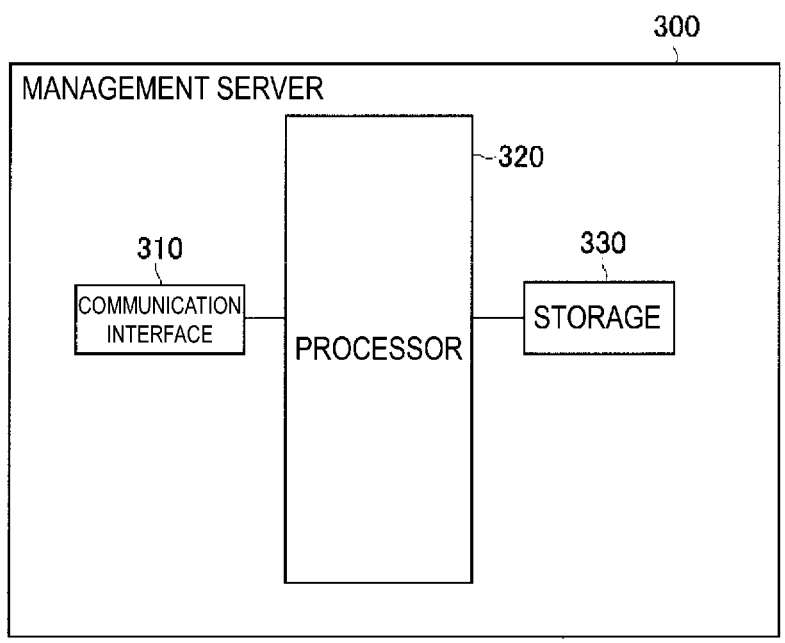
FIG. 3 is a diagram illustrating a configuration of a management server according to an embodiment.

Now, a configuration of the management server 300 according to an embodiment will be described. FIG. 3 illustrates a configuration of the management server 300 according to an embodiment.

As illustrated in FIG. 3, the management server 300 includes a communication interface 310, a processor 320, and a storage 330.

The communication interface 310 is connected by wire or wirelessly to the communication network 200. The communication interface 310 receives various messages and information from each communication device 100. For example, the communication interface 310 receives the installation notification message and the movement notification message described above.

The processor 320 performs various processing and control in the management server 300. The processor 320 executes programs stored in the storage 330 to perform various processing.

The storage 330 includes a volatile memory, a non-volatile memory, and an auxiliary storage device (such as a hard disk). The storage 330 stores programs to be executed by the processor 320 and information to be used for processing by the processor 320.

The storage 330 stores a position information list as illustrated in FIG. 4. The position information list is a list including installation position information for each communication device 100. For example, the position information list is a list that associates the ID of the communication device 100 with position information indicating the installation position of the communication device 100. The position information may be GNSS position information including latitude and longitude.

In the management server 300 configured in this manner, the communication interface 310 receives information indicating at least one of the position or the acceleration detected by each communication device 100. For example, the communication interface 310 receives an installation notification message including position information indicating the position detected by the communication device 100.

The processor 320 configures the collection mode for collecting at least one of the communication devices 100 managed by the management server 300 as installed devices. The processor 320 may configure the collection mode based on information received from the management terminal 400 by the communication interface 310.

The collection mode may be a mode for collecting all of the communication devices 100 managed by the management server 300 as installed devices, or a mode for specifying and collecting some of the communication devices 100 managed by the management server 300 as an installed device. The processor 320 may configure the collection mode for only the communication devices 100 specified by the management terminal 400. When the processor 320 configures the collection mode, the processor 320 transmits a notification indicating the initiation of the collection mode, via the communication interface 310 to the communication device 100 intended for the collection mode.

The processor 320 manages the position information list stored in the storage 330 based on the information received by the communication interface 310.

In a case that the collection mode is not configured, in response to determining that the communication device 100 has been stationary after moving, based on the installation notification message received by the communication interface 310, the processor 320 updates the position information list to add position information indicating the position of the communication device 100 in a stationary state, to the list as installation position information. Specifically, the processor 320 adds the device ID and position information included in the installation notification message to the position information list. The device IDs of the communication devices 100 to be managed may be registered in advance in the position information list. In this case, the processor 320 only adds, to the position information list, the position information included in the installation notification message.

Thus, the installation position of each communication device 100 is automatically registered, thus eliminating the need for the recording operation for marking the installation position of each communication device or making a note for the installation position.

With the collection mode configured, in response to determining that the target communication device intended for the collection mode has moved based on the movement notification message received by the communication interface 310, the processor 320 updates the position information list to delete, from the list, the installation position information corresponding to the target communication device. Specifically, the processor 320 deletes, from the position information list, the device ID included in the movement notification message and the position information associated with the device ID. The processor 320 may exclusively delete the position information associated with the device ID included in the movement notification message, while keeping the device ID in the position information list.

This enables automatic and efficient determination of whether the communication device 100 to be collected has been collected.

On the other hand, with the collection mode configured, in response to determining that the target communication device intended for the collection mode has been stationary after moving, based on the installation notification message received by the communication interface 310, the processor 320 keeps the position information list without updating the position information list. In other words, even in response to receiving the installation notification message from the collected communication device 100, the processor 320 does not add, to the position information list, the position information included in the installation notification message. This enables prevention of an increase in processing load due to the management, by the server, of the position of the collected communication device 100.

When the collection mode is configured, the processor 320 may transmit, to the target communication device via the communication interface 310, an indication to cause the target communication device to start outputting at least one of the sound or the light. The processor 320 may include such an indication in the notification indicating the initiation of the collection mode, and transmit the notification.

With the collection mode configured, in response to determining that the target communication device has moved based on the movement notification message received by the communication interface 310, the processor 320 may transmit, to the target communication device via the communication interface 310, an indication causing the target communication device to terminate the output of at least one of the sound or the light.

Figure 5:
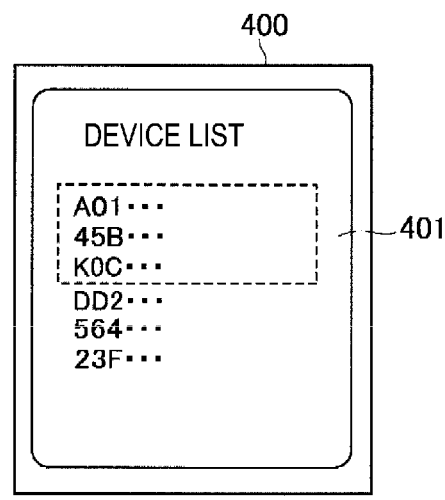
FIG. 5 is a diagram illustrating an example of information display based on the position information list according to an embodiment.

Furthermore, with the collection mode configured, the processor 320 may control the management terminal 400 (the display 401) to display information based on the position information list, as illustrated in FIG. 5. For example, the processor 320 transmits the ID and position information of the target communication device to the management terminal 400, and these pieces of information are displayed on the display 401 of the management terminal 400.

In this regard, the processor 320 may group target communication devices of the plurality of target communication devices intended for the collection mode into a group, the target communication devices being within a predetermined distance from each other, and cause the management terminal 400 (display 401) to display the group in an identifiable display manner. The display manner making the group identifiable refers to, for example, displaying the respective groups in different colors or surrounding each group with a frame. This allows the collection personnel to identify a group of target communication devices that can be collected all together by the collection personnel.

Operation Example of Device Management System

Now, an operation example of the device management system 1 according to an embodiment will be described.

Figure 6:
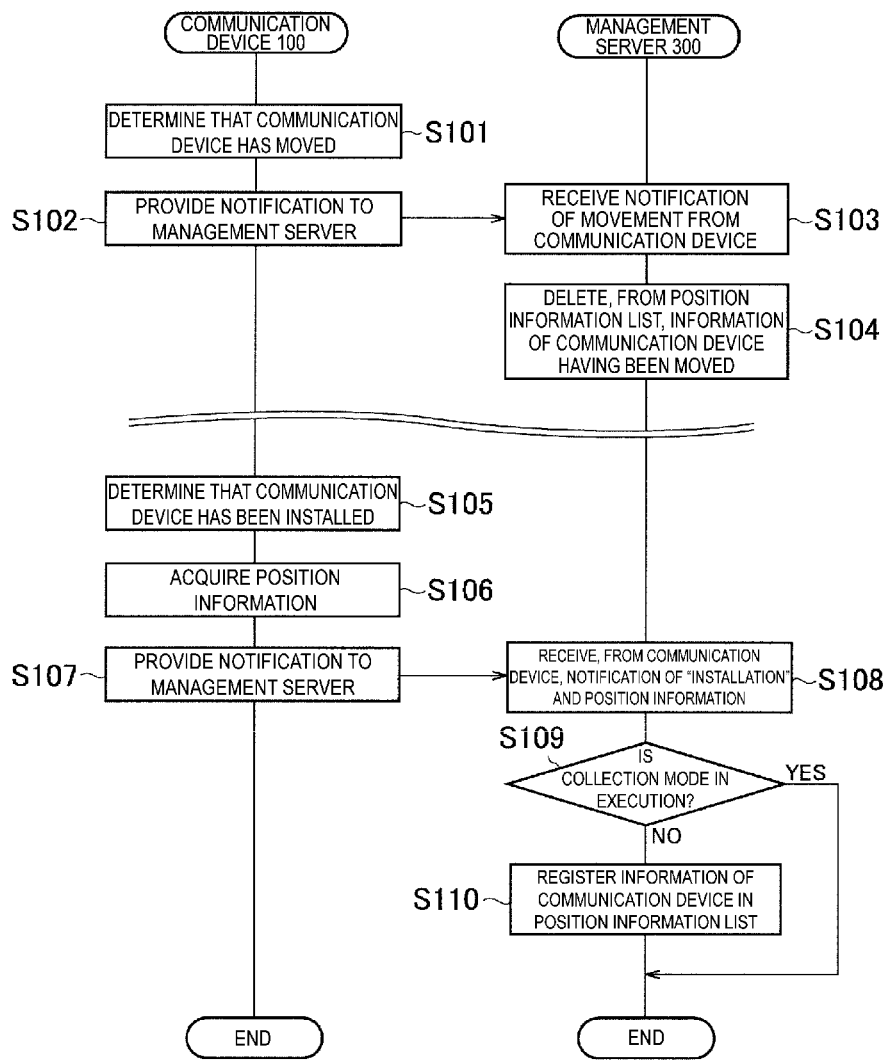
FIG. 6 is a diagram illustrating an example operation of the device management system related to update of the position information list according to an embodiment.

FIG. 6 is a diagram illustrating an operation example related to update of the position information list in the device management system 1 according to an embodiment.

As illustrated in FIG. 6, in step S101, the processor 130 of the communication device 100 determines that the communication device 100 has moved based on, for example, the acceleration detected by the acceleration sensor 162. Specifically, the processor 130 determines that the communication device has transitioned from the stationary state to the moving state.

In step S102, the processor 130 of the communication device 100 transmits, to the management server 300, the movement notification message including the ID of the communication device.

In step S103, the communication interface 310 of the management server 300 receives the movement notification message from the communication device 100.

In step S104, the processor 320 of the management server 300 updates the position information list to delete the position information (and the device ID) of the communication device 100 having moved, from the position information list based on the movement notification message received.

However, when the communication device 100 is initially installed, the position information (and the device ID) of the communication device 100 having moved may be unregistered in the position information list, the processing in step S104 is omitted. Alternatively, the processor 130 of the communication device 100 may exclusively allow the transmission of the movement notification message after the communication device is once installed.

In step S105, the processor 130 of the communication device 100 determines, for example, based on the acceleration detected by the acceleration sensor 162, that the communication device has been stationary after moving, i.e., that the communication device has been installed. Specifically, the processor 130 determines that the communication device has transitioned from the moving state to the stationary state.

In step S106, the processor 130 of the communication device 100 uses the position sensor 161 to acquire position information in a stationary state.

In step S107, the processor 130 of the communication device 100 transmits an installation notification message including the acquired position information and the device ID of the communication device to the management server 300.

In step S108, the communication interface 310 of the management server 300 receives the installation notification message from the communication device 100.

In step S109, the processor 320 of the management server 300 determines whether the collection mode is in execution (collection mode has been configured). In response to determining that the collection mode is not in execution (step S109: NO), in step S110, the processor 320 updates the position information list to add, to the list, the position information (and the device ID) included in the installation notification message received. On the other hand, in response to determining that the collection mode is in execution (step S109: YES), the processor 320 terminates the flow without updating the position information list.

Figure 7:
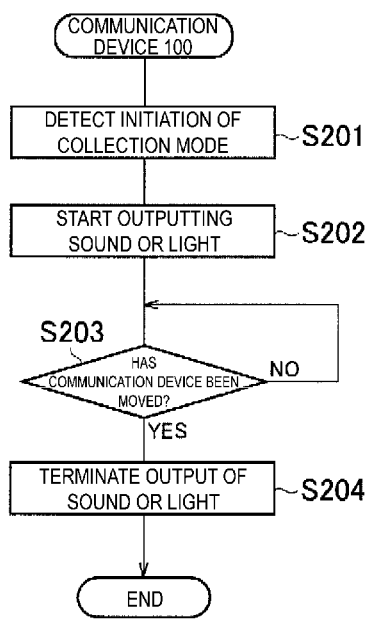
FIG. 7 is a diagram illustrating an example operation of the communication device in the device management system in a collection mode according to an embodiment.

FIG. 7 illustrates an operation example of the communication device 100 during the collection mode in the device management system 1 according to an embodiment.

As illustrated in FIG. 7, in step S201, the processor 130 of the communication device 100 detects the initiation of the collection mode.

In step S202, the processor 130 of the communication device 100 causes the output device 180 to start outputting at least one of the sound or the light.

In step S203, the processor 130 of the communication device 100 determines whether the communication device has moved based on, for example, the acceleration detected by the acceleration sensor 162. Specifically, the processor 130 determines whether the communication device has transitioned from the stationary state to the moving state.

In response to determining that the communication device has moved (step S203: YES), in step S204, the processor 130 of the communication device 100 causes the output device 180 to terminate the output of at least one of the sound or the light. The processor 130 also transmits the movement notification message to the management server 300.

OTHER EMBODIMENTS

In addition, an example has been described in the above-described embodiment, in which the communication devices 100 are sensor devices including various sensors. However, each communication device 100 is not limited to a sensor device, and may be any device having a communication function and installed at a certain position.

A program may be provided that causes a computer to execute the processing performed by the communication device 100 or the management server 300. The program may be recorded in a computer readable medium. Use of the computer readable medium enables the program to be installed on a computer. Here, the computer readable medium on which the program is recorded may be a non-transitory recording medium. The non-transitory recording medium is not particularly limited and may be, for example, a recording medium such as a CD-ROM or a DVD-ROM. Functional units (circuits) configured to execute the processing performed by the communication device 100 or the management server 300 may be integrated, and the communication device 100 or the management server 300 may be configured as a semiconductor integrated circuit (chipset or SoC).

Embodiments have been described above in detail with reference to the drawings, but specific configurations are not limited to those described above, and various design modifications can be made without departing from the gist of the present disclosure.

The invention claimed is:

1. A management server for managing a plurality of communication devices, the management server comprising:

a communication interface configured to receive information indicating at least one of a position or acceleration detected by each of the plurality of communication devices; and a processor configured to manage a position information list including a plurality of installation position information each corresponding to one of the plurality of communication devices, based on the information received by the communication interface, wherein when being configured a collection mode for collecting at least one of the plurality of communication devices, the processor is configured to:

in response to determining that a target communication device among the plurality of communication devices that is a target of the collection mode has moved, delete the installation position information corresponding to the target communication device from the position information list; and in response to determining that the target communication device has been stationary after moving, maintain the position information list without updating the position information list, and when being not configured the collection mode, the processor is configured to:

in response to determining that a communication device of the plurality of communication devices has been stationary after moving, update the position information list to add position information indicating a position of the communication device in a stationary state, as the installation position information.

2. The management server according to claim 1, wherein the processor is configured to transmit, to the target communication device via the communication interface, an indication to cause the target communication device to start outputting at least one of sound or light when the collection mode is configured.

3. The management server according to claim 2, wherein the processor is configured to, in a case that the collection mode is configured, in response to determining that the target communication device has moved, transmit, to the target communication device via the communication interface, an indication to cause the target communication device to terminate output of at least one of the sound or the light.

4. The management server according to claim 1, wherein the processor is configured to, in a case that the collection mode is configured, group, based on the position information list, target communication devices out of a plurality of the target communication devices for the collection mode into a group, the target communication devices being within a predetermined distance from each other, and cause the group to be displayed on a display in an identifiable display manner.

* * * * *